March 12, 1963 G. R. NICKERSON ET AL 3,080,774
CLUTCH ASSEMBLY
Filed Nov. 7, 1960 6 Sheets-Sheet 1

INVENTORS.
GEORGE R. NICKERSON, BRADFORD K. SHULL,
BY and MARION W. DININGER

Lockwood, Woodard, Smith & Weikart
Attorneys

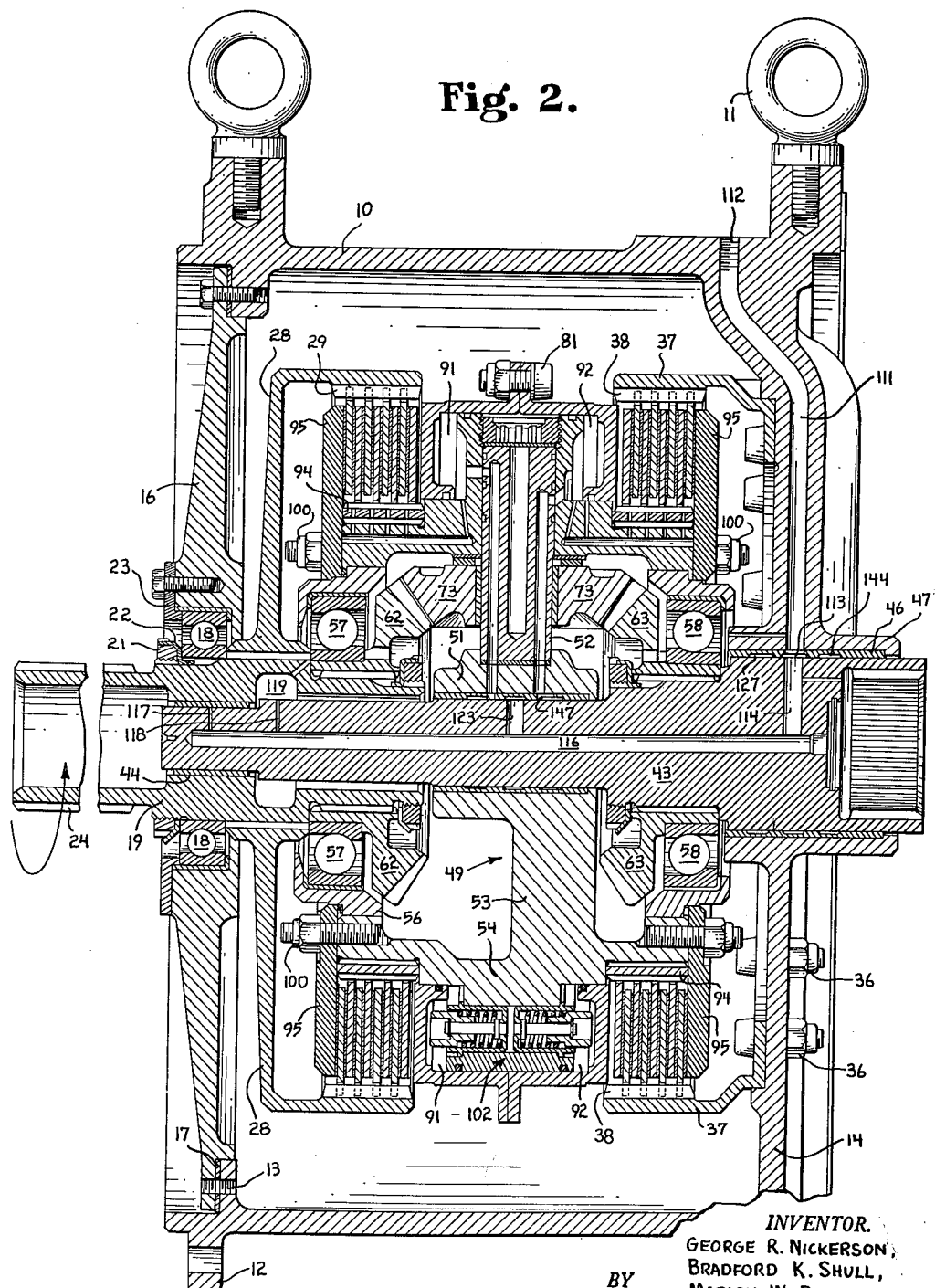

March 12, 1963 G. R. NICKERSON ET AL 3,080,774
CLUTCH ASSEMBLY
Filed Nov. 7, 1960 6 Sheets-Sheet 3

INVENTOR.
GEORGE R. NICKERSON, BRADFORD K. SHULL
BY and MARION W. DININGER

*Lockwood, Woodard, Smith & Wickart*
Attorneys

INVENTOR.
GEORGE R. NICKERSON,
BRADFORD K. SHULL,
and MARION W. DININGER
BY
Lockwood, Woodard, Smith & Weikart
Attorneys March 12, 1963    G. R. NICKERSON ET AL    3,080,774
CLUTCH ASSEMBLY
Filed Nov. 7, 1960    6 Sheets-Sheet 6

INVENTOR.
GEORGE R. NICKERSON,
BRADFORD K. SHULL, and
BY  MARION W. DININGER

Lockwood, Woodard, Smith & Weikart
Attorneys

United States Patent Office 3,080,774
Patented Mar. 12, 1963

3,080,774
CLUTCH ASSEMBLY
George R. Nickerson, Bradford K. Shull, and Marion W. Dininger, Indianapolis, Ind., assignors to The Buehler Corporation, a corporation of Indiana
Filed Nov. 7, 1960, Ser. No. 67,826
2 Claims. (Cl. 74—780)

This invention relates generally to friction type clutch assemblies and in particular to a clutch assembly incorporated in a planetary gear system of power transmission.

In certain power transmission applications such as those connected with marine engines, it is important to provide a clutch and transmission assembly which can be selectively actuated to provide a direct drive between the input and output shafts, total disconnection of the input and output shafts and a reversal of the direction of rotation of the output shaft with respect to the input shaft. Such assemblies must be relatively light in weight and yet extremely strong so as to survive relatively high overloads and impact shocks. They must also be capable of a complete and effective shift from direct drive to reverse drive at rated speed in a relatively short interval of time of the order of three seconds.

The assembly of the present invention utilizes differential gearing assembled within two multiple plate friction clutches. The clutches are selectively actuated by hydraulic pressure to provide either a direct drive coupling or a reverse drive coupling. The clutch plates are cooled and lubricated both when engaged and disengaged, each clutch having a unitary system of fluid passages for providing both clutch actuating pressure and clutch plate and bearing lubricating and cooling fluid pressure.

The primary object of the present invention is to provide a clutch assembly which can be shifted from direct drive to reverse drive in relatively short interval and which is characterized by high strength and reliability of operation.

A further object of the present invention is to provide a clutch assembly of the type referred to in which a unitary hydraulic fluid system is used to actuate, cool and lubricate each of the clutches.

A further object of the present invention is to provide a clutch assembly of the type referred to in which lubricating and cooling fluid is passed through the clutches in all three of their positions, that is, forward, neutral and reverse.

A further object of the present invention is to provide a clutch assembly of the type referred to in which means are provided for retaining the flow of cooling and lubricating fluid at a proper level whether or not the pressure of the fluid is increased by the action of centrifugal force.

The full nature of the invention will be understood from the accompanying drawings and the following description and the claims.

FIG. 2 is a side sectional view taken generally along the line 2—2 of FIG. 1.

Figure 1:
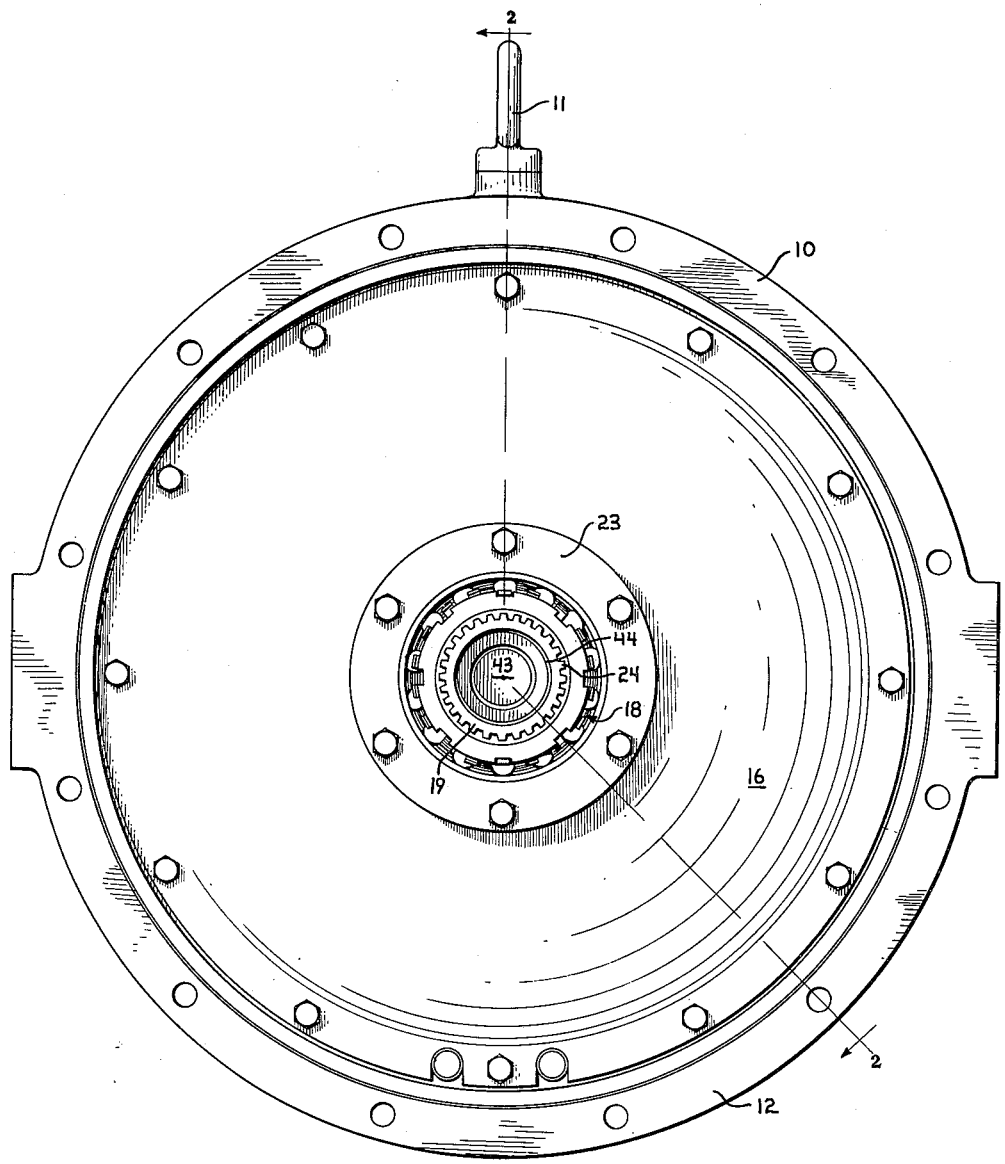
FIG. 1 is an end view of the assembly of the present invention.

Referring initially to FIGS. 1, 2, 6 and 7 the assembly includes a cup-shaped housing 10 carrying eye-bolts 11 and mounting flanges 12 (FIG. 2). A fluid discharge aperture 13, which may be connected to a suitable discharge conduit (not shown), is also provided in the housing. The closed end wall of the housing is identified at 14 in FIG. 2. Bolted to the left hand end of the housing is a cover or end plate 16, the junction being sealed by a suitable annular gasket or shim 17.

The cover 16 is formed to support the outer race of a ball bearing assembly 18 which journals a tubular input shaft 19. The shaft 19 is externally threaded to accommodate the spanner nut 21 which is turned down against the washer 22. A bearing retainer ring 23 is bolted to the cover 16. The input shaft 19 is externally splined as indicated at 24 and is driven by any suitable prime mover such as a gas turbine or other drive means.

An intermediate portion of the shaft 19 is externally splined as indicated at 26 and this portion of the shaft meshes with a correspondingly splined hub section 27 of a ring member 28. The member 28 is cup shaped and its inner marginal surface is splined as shown at 29. The internally splined portion of the member 28 meshes with the teeth 31 formed in a series of identical clutch plates 32. The clutch plates have an annular configuration and each side of these plates is provided with a conventional friction facing 33. It will be evident that the input shaft 19, the member 28 and the clutch plates 32 are mechanically linked so that they rotate in unison.

Bolted to the end wall 14 of the housing by means of bolts 36 is a tubular member 37 which extends within the housing in registering, opposed relation to the member 28. The member 37 is internally splined at 38 and this splined area meshes with the peripheral teeth 39 of a series of friction elements or brake plates 41 which are identical to the clutch plates 32. The plates 41 carry friction facing 42 which corresponds with the facing 33 carried by the plates 32.

The input shaft 19 accommodates an output shaft 43, the shaft 43 being journaled in a sleeve type bearing 44 adjacent the area of its furthest extension into the shaft 19. The opposite end of the shaft 43 is journaled in a sleeve type bearing 46 carried within a hub portion 47 of the housing end wall 14. A central sleeve bearing 48 encircles the shaft 43 and is supported by a central member or spider structure indicated generally at 49. The spider structure includes a hub portion 51 from which radially extend four idler shaft assemblies 52. While only one idler shaft assembly 52 is shown in FIG. 2, it will be understood that the other identical idler shaft assemblies extend from the hub portion spaced at 90° from the idler shaft assembly shown. Spaced axially from the idler shaft assemblies are a plurality of radially extending members 53 which are integral with the hub portion 51. The members 53 merge with an integral peripheral portion 54 having an annular configuration. The margins 56 of the portion 54 are formed to accommodate ball bearing assemblies 57 and 58, the bearing assemblies 57 and 58 being further received in the hub portions 59 and 61, respectively of the bevel gears 62 and 63. The hub portions of the bevel gears are internally splined at 64 and the splined portion of gear 62 meshes with corresponding splines 66 formed on the input shaft 19, the spanner nut 67 and washer 68 serving to retain the gear on the shaft. Similarly, the splined portion 64 of the gear 63 engages with corresponding splines 69 formed on the output shaft 43, the gear being retained on the shaft by means of the spanner nut 71 and washer 72.

The gears 62 and 63 mesh with the idler gears 73 carried by each of the four idler shaft assemblies 52. The gears 73 are each supported on a sleeve bearing 74 which permits the idler gears to rotate about the idler shafts 52 which are fixed against axial rotation by their rigid mounting within the hub portion 51. The upper end of the idler shaft shown in FIG. 2 extends into the portion 54 and is locked therein by means of the nut 76. The idler shaft is encircled by sealing rings 77 disposed at spaced locations along the shaft to seal the various fluid passages in the shaft which will subsequently be described.

Underlying the ends of the shafts 52 are two annular bands 78 and 79 which are flanged outwardly and bolted together by means of bolts 81. Internally flanged portions 82 and 83 of the bands 78 and 79 respectively slideably engage the adjacent horizontal area of the portion 54 and annular seals 84 and 86 provide a seal therebetween. Sealing rings 87 and 88 provide a seal between the peripheral inner margins of the bands 78 and 79 and the portion 54. It will be evident from FIG. 2 that the unitary structure formed by the bands is slideable horizontally with relation to the portion 54 and that the annular open area between the band 78 and the portion 54 provides an annular pressure chamber 91 and that a similar annular pressure chamber 92 is defined by the space between the end of the band 79 and the portion 54. The portion 54 is further splined as indicated at 93 and these splined portions mesh with the internal splines formed on identical sleeves 94. The sleeves 94 are retained in position by annular back-up plates 95 which are bolted by means of bolts 100 to the portion 54. The external surface of the sleeves is also splined as indicated at 96 and the external splines formed on the left hand one of the sleeves 94 mesh with the teeth 97 formed at the inner margin of a series of annular clutch plates 98. These clutch plates 98 extend in interposed relation with the clutch plates 32. Similarly, the splined portion 96 of the right hand one of the sleeves 94 mesh with the teeth 99 formed at the inner margin of the annular friction elements or brake plates 101, these brake plates extending in interposed relation with the brake plates 41.

The unitary structure formed by the bands 78 and 79 are centered on the portion 54 by centering spring assemblies. While only one of these centering spring assemblies appears in FIG. 1 and is there generally identified at 102, it will be understood that four such centering spring assemblies, spaced 90° from each other, are present in the structure. The centering spring assemblies include opposed spring cups 103 and 104 carried by the portion 54. Each of the cups has extending axially therethrough a post 106 which receives a piston member 107. Extending between the base of the cups 103 and 104 and the inner face of the respective pistons 107 are compression springs 108 which urge the pistons outwardly from the cups, the extent of such outward movement being limited by the retaining rings 109 carried at the ends of the posts 106. The outer ends of the pistons 107 engage the adjacent surfaces of the bands 78 and 79 and the springs 108 thus resist sideward motion of the bands away from their central position shown in FIG. 2.

Figure 4:
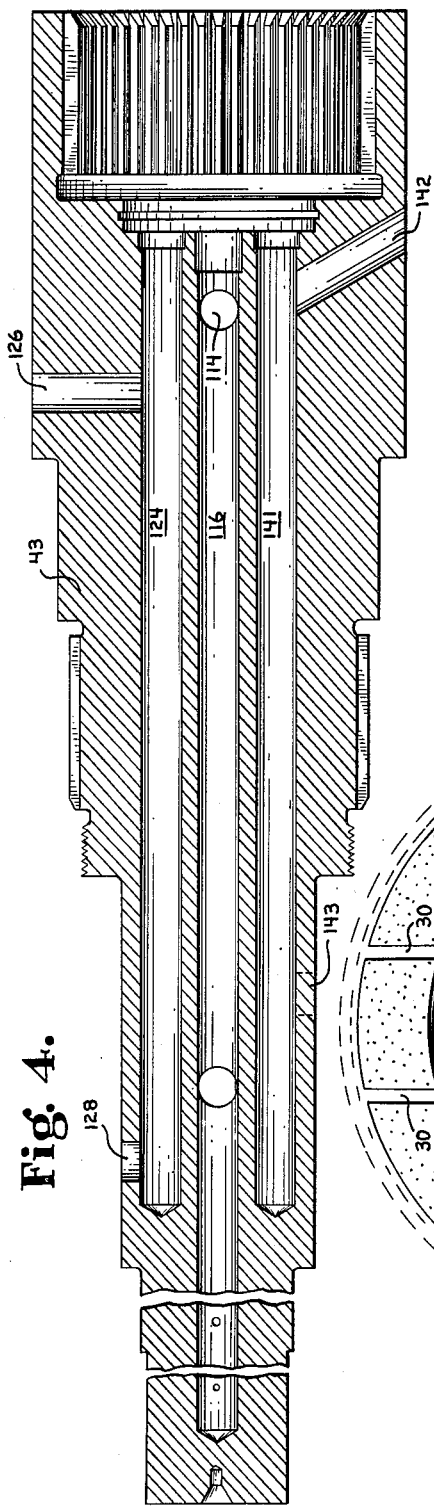
FIG. 4 is a sectional view of the output shaft taken generally along the line 4—4 of FIG. 3.
Figure 3:
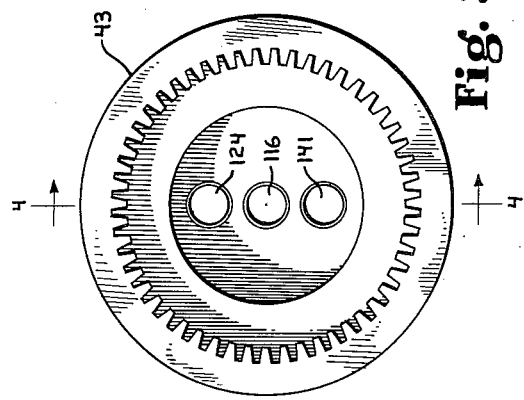
FIG. 3 is a right hand, end view of the output shaft.
Figure 6:
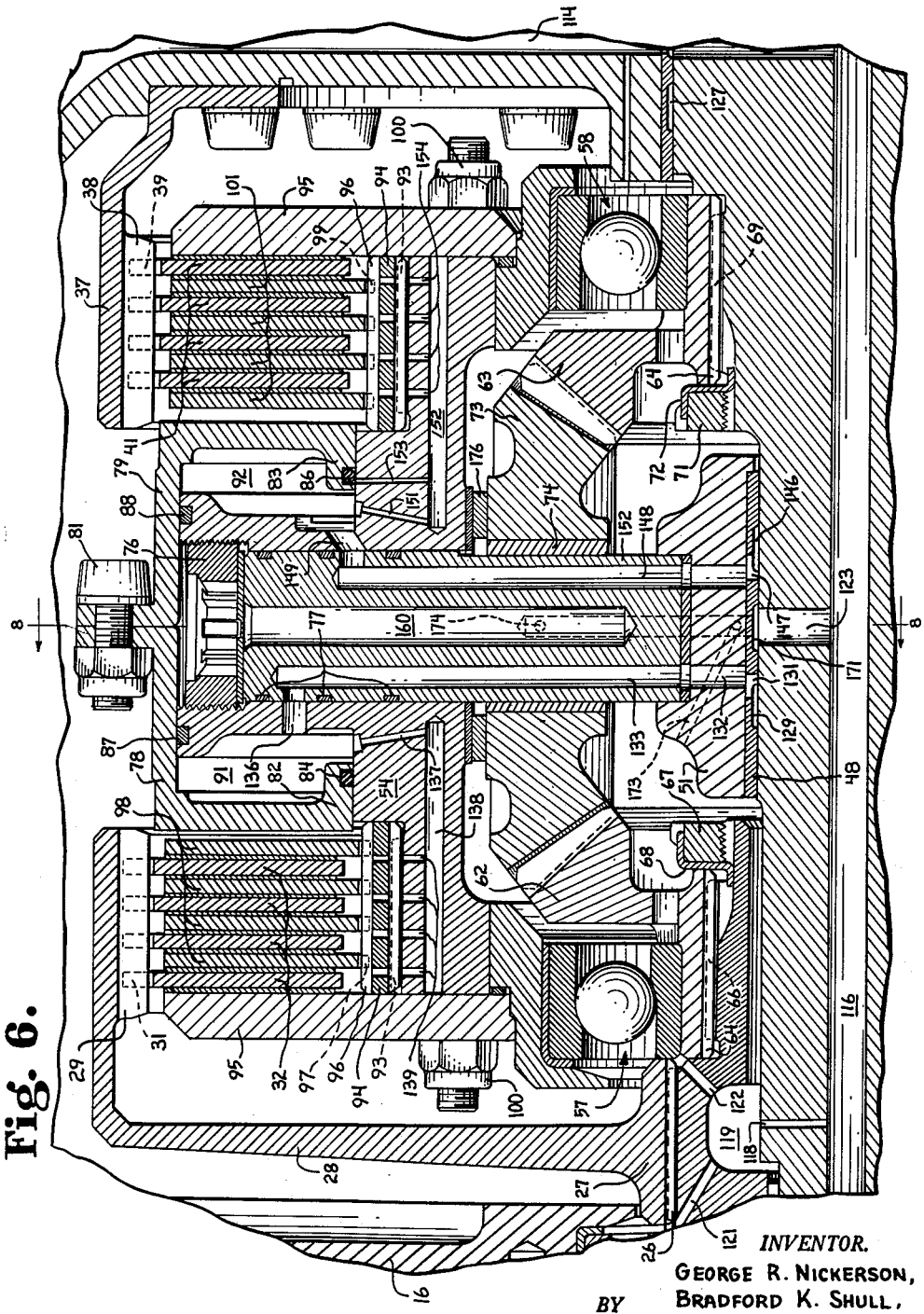
FIG. 6 is an enlarged view of the upper portion of the structure shown in FIG. 2.
Figure 7:
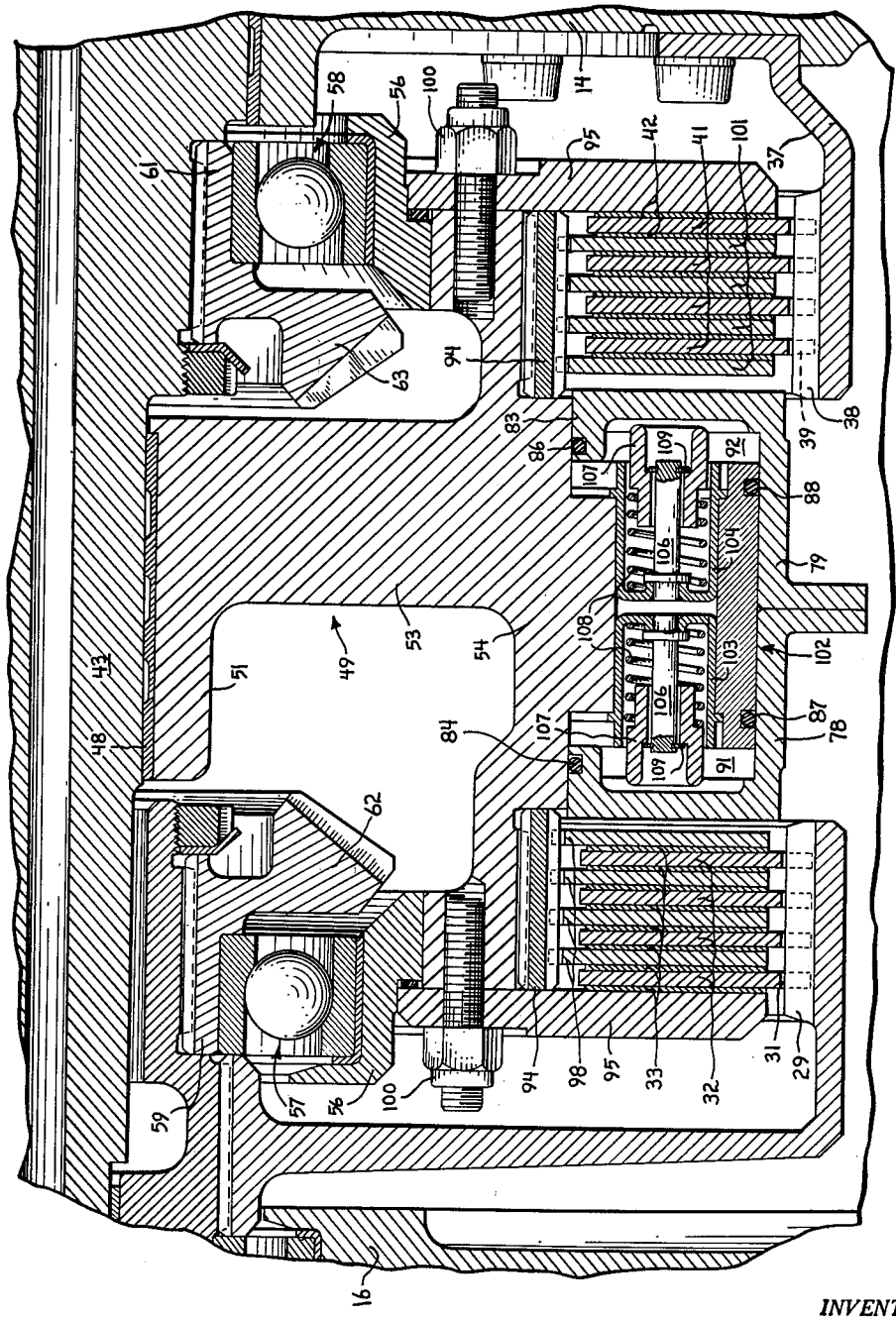
FIG. 7 is an enlarged view of the lower portion of the structure shown in FIG. 2.

Referring primarily to FIGS. 2, 3 and 4, the passages forming the hydraulic actuating system and the cooling and lubricating system will now be described. As will be evident from FIG. 1 the end wall 14 of the housing is provided with a passage 111 which may be connected at 112 to a source of lubricating oil under a pressure of, for example, 20–40 lbs. per square inch. This oil pressure may be supplied by the engine lubricating oil pump or by an auxiliary pump (not shown). The passage 111 communicates with an annular groove 113 in the sleeve 46 which, in turn, communicates with a transverse passage 114 in the shaft 43. The passage 114 communicates with a central, axial passage 116 which extends substantially the entire length of the shaft 43. A transverse passage 117 in the shaft 43 conveys lubricating oil to the sleeve 44 and a passage 118 conveys lubricating oil to the annular space 119 surrounding the shaft 43. Passages 121 and 122 (FIG. 6) transmit lubricating oil from the space 119 to the bearing assemblies 18 and 57 respectively. A transverse passage 123 in shaft 43 transmits lubricant oil through groove 171 (FIG. 6) in bearing sleeve 48 to passage 172 which extends through hub 51 and into idler shaft 152, the passage 172 extending parallel to but spaced laterally from the axial aperture 160 in idler shaft 152. Lubrication oil is also transmitted from passage 172 through passage 173 to lubricate the teeth of gears 62, 63 and 73. Oil is also transmitted through passage 174 in idler shaft 152 to lubricate sleeve bearing 74 and the thrust plate 176 (FIG. 6). It will be understood that passages 172, 173 and 174 and thrust plate 176 have identical counterparts at each of the idler shaft locations.

Figure 8:
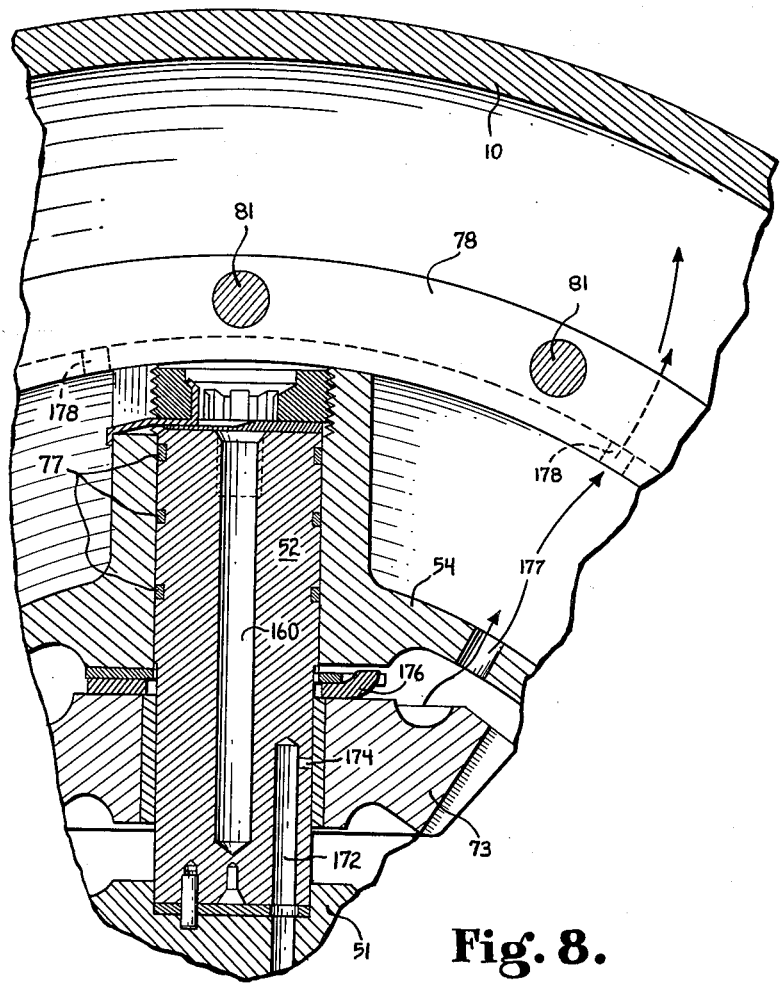
FIG. 8 is a fragmentary sectional view taken generally along the line 8—8 of FIG. 6.

The lubricating oil for sleeve bearing 74, thrust plate 176 and adjacent gears exits through passages 177 (FIG. 8) in the spider 54 between the idler shafts. From this area the oil flows through passages 178 in the band 78 to the inside of the clutch housing 10 where the oil is drained away through aperture 13 (FIG. 2). It will be understood that the portion of the spider 51 underlying the band 79 has passages formed therein which are the exact counterparts of passages 177 (FIG. 8) and that the band 79 has formed therein passages which are duplicates, in form and function, of the passages 178.

As will be evident from FIGS. 3 and 4, the shaft 43 is provided with a longitudinal passage 124 which, since it is horizontally aligned with passage 116, does not appear in FIG. 2. A transverse passage 126 formed in the shaft 43 communicates with the passage 124. The passage 126 further communicates with a passage formed in the end wall 14 and extending to the exterior of the housing in the same fashion as the passage 111. It will be understood that this passage extends radially outwardly and is spaced angularly from the passage 111 so that it does not appear in FIG. 2. In general configuration, however, it is identical to the passage 111. The annular groove 127 (FIG. 2) in the sleeve 46 provides communication between the passage extending through the housing end wall and the passage 126 (FIG. 4) irrespective of the position of the shaft 43. A transverse passage 128 (FIG. 4) in the shaft 43 communicates with the passage 124 and with an annular groove 129 (FIG. 2) in the sleeve 48 and an aperture 131 in the sleeve provides communication with the vertical passage 132 in the hub portion 51. The idler shaft 52 is provided with a longitudinal passage 133 which registers with the passage 132. Adjacent the upper end of the passage 133 the idler shaft is provided with a radially extending passage 134 which registers with a transverse passage 136 in the portion 54 and communicates with the chamber 91. A passage 137 is formed in the portion 54 and extends from the base of the chamber 91 to a horizontal passage 138. Extending upwardly through the portion 54 and through the sleeve 94 are a series of vertical passages 139 which communicate with the passage 138. The friction facing 33 on the clutch plates 32 is chordally slotted as indicated at 30 in FIG. 5. These slots permit fluid to flow from the external spline area of the sleeve 94 out to the periphery of the clutch plates providing for heat transfer from the plates to the fluid and thus limiting the temperature rise of the plates.

Referring again to FIGS. 3 and 4 it will be noted that the output shaft 43 has a further longitudinal passage 141 which extends parallel to the passages 116 and 124. A transverse passage 142 in the shaft 43 communicates with the passage 141 and at its outer end communicates with a groove 144 (FIG. 2) in the sleeve 46. The groove 144 in turn communicates with a passage extending radially within the housing end wall 14 and similar in shape and configuration to the passage 111 (FIG. 2). This passage does not appear in FIG. 2 but, as the case with the end wall passage communicating with the transverse passage 126 (FIG. 4), it extends to the exterior of the housing and is connected to a source of clutch actuating and lubricating fluid pressure. A transverse passage 143

Figure 5:
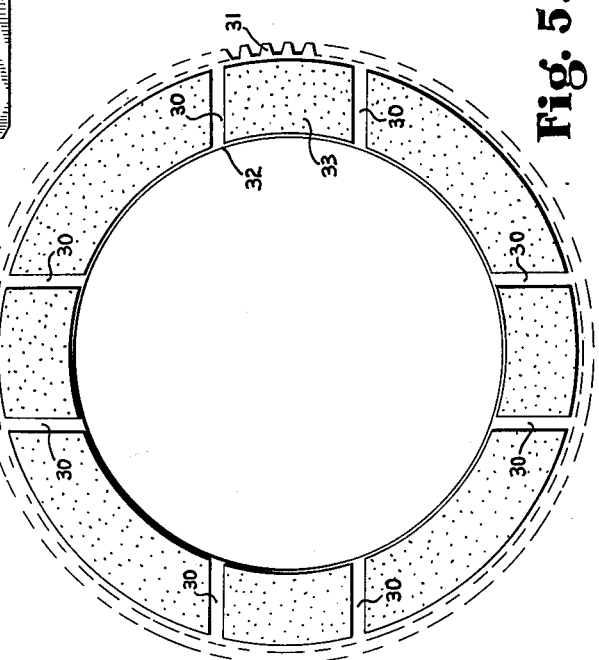
FIG. 5 is a side view of one of the clutch plates which form a component of the assembly of the present invention.

(FIG. 4) in the shaft 43 also communicates with the passage 141 and with an internal groove 146 (FIG. 2) in the sleeve 48. As may be seen in FIG. 2 the groove 146 communicates with an aperture 147 in the sleeve 48, the aperture registering with a passage 148 extending through the hub 51 and through the idler shaft 52. At its upper end the passage 148 communicates with a passage 149 which terminates at the chamber 92. A passage 151 provides communication between the chamber 92 and the horizontal passage 152 in the portion 54. A second passage 153 extends between the chamber 92 and the passage 152, this passage 153, however, is closed by the portion 83 of the band 79 when the unitary structure formed by the bands 78 and 79 are in their central portion as shown in FIG. 2. Extending through the portion 54 and the sleeve 94 are a series of passages 154. The frictional facing 42 of the brake plates 41 is also chordally slotted in the same fashion as shown in FIG. 5 with respect to clutch plates 32, the slots in the facing 42 being identical to the slots 30 in the clutch plates 32. As is the case with the slots 30, the slots in the facing 42 permit cooling fluid to flow outwardly to the peripheral area of the clutch plates. It will be understood that the lubricating and clutch actuating fluid flowing in the passage described above moves into the space enclosed by the housing 10 and flows out of the housing through the discharge opening 13.

The operation of the structure of the present invention will now be described with reference to FIG. 2. As shown in FIG. 2, the clutch is in neutral or disengaged position. Under such conditions the passage 111 and the two counterpart passages in the end wall 14, communicating with the passages 124 and 141 (FIG. 4) in the output shaft 43, are all connected to a source of fluid pressure the pressure having a magnitude of, for example, 20–40 lbs. per square inch. Under these conditions fluid will flow through all the passages previously described and the chambers 91 and 92 will be pressurized. The centering spring assemblies will maintain the unitary structure formed by the bands 78 and 79 in their position of FIG. 2 so that the clutch plates 98 and 32 may move freely relative to each other and, correspondingly, the brake plates 101 and 41 may move freely relative to each other. Under these condidtions, assuming the input shaft 19 to be rotating in the direction indicated by the arrow in FIG. 2, the ring 28 will be correspondingly rotated in the same direction carrying with it the clutch plates 32. Since the clutch plates 32 may move relative to the clutch plates 98 no power is transmitted through these plates. It has been assumed that input shaft 19 is rotating as shown in FIG. 2. Under these conditions gear 62 is rotating in the same direction and at the same speed as shaft 19. Gear 63 can be held stationary because no power is transmitted through disengaged clutch plates 32 and 98. Under these conditions the spider 54, gear 73, idler shaft 52, and other parts that are rigidly connected to the spider will rotate in the same direction and at one-half the speed of the input shaft 19, with no power being transmitted to the output shaft 43.

Assuming that direct drive is to be established between the input shaft 19 and the output shaft 43 the condition of the external source of fluid pressure for the passage 124 (FIG. 4) is increased to a magnitude of, for example, 100 to 150 lbs. per square inch. This raises the pressure in the chamber 91 so as to shift leftwardly the unitary structure formed by the bands 78 and 79 pressing the clutch plates 32 and 98 into motion transferring relationship with each other. It will be noted that under these conditions the passage 137 retains circulation of fluid into the clutch plate area. With the rotary motion of the input shaft 19 being transferred through the clutch plates 32 and 98, the portion 54, the gear 62 and the hub portion 51 will be rotated with the input shaft. Since the idler shafts 52 are carried along by the hub 51 as it rotates, the idler gears 73 will be carried with the corresponding idler shafts 52 but will not be rotated about the axes of the idler shafts. Since the idler gears 73 do not rotate about their idler shaft axes the rotary motion of the gear 62 will be directly transferred to the gear 63, which, in turn, rotates the output shaft 43 uniformly with the input shaft 19.

The output shaft 43 may be rotated at the same speed as the input shaft 19 but in reverse direction by reducing the pressure in the chamber 91 to the normal datum pressure of 20–40 lbs. per square inch and increasing the pressure in the chamber 92 to the actuating pressure of 100 to 150 lbs. per square inch. This shifting in pressure may, as previously pointed out, be accomplished by altering the pressure provided by the fluid pressure source connected to the passages 124 and 141 (FIG. 4). The required increase in pressure in the chamber 92 shifts the unitary structure formed by the bands 78 and 79 rightwardly so that the outer end face of the band 79 engages the adjacent brake plate 101 and moves the brake plates 101 and 41 into locking relation with each other. This shifting of the bands 78 and 79 releases the clutch plates 32 and 98 and rotation of the portion 54 and the hub 51 with the input shaft 19 thereupon ceases. Since gear 62 must rotate with the input shaft 19, the idler gears 73 will be driven to rotate about the now stationary idler shafts 52. Rotation of the idler gears 73 drives the gear 63 at the same speed as but in a direction opposite to the rotation of the gear 62. Since gear 63 is splined to the output shaft 43, it will be apparent that the output shaft will thereby be rotated at the same speed as the input shaft but in the opposite direction.

Upon removal of the actuating pressure from the chamber 92, permitting the pressure therein to drop to the normal lubricating pressure, the centering spring assemblies 102 will return the unitary structure formed by the bands 78 and 79 to their central position indicated in FIG. 2 wherein all of the clutch plates and brake plates are released for relative movement and the clutch is in disengaged position.

It will be noted that the chamber 91 has only a single passage 137 for transmitting cooling and lubricating fluid to the passage 138, and that the chamber 92 is provided with two such passages identified at 151 and 153. It will further be noted that the passage 153 is unobstructed for fluid flow only when the brake plates 41 and 101, providing reverse drive, are engaged. The differential in passage area available for cooling and lubricating fluid flow from the chamber 92 is an important factor in providing the uniform desired lubricating and cooling fluid flow no matter what the position of the clutch assembly. This will be evident when it is noted that with the structure formed by the bands 78 and 79 shifted leftwardly to engage the clutch plates 32 and 98, the bands 78 and 79 will be rotated about the coincident axes of the shafts 19 and 43. Under these conditions, the fluid pressure in the chambers 91 and 92 will include a pressure increment of substantial size resulting from the action of centrifugal force on the fluid in the chambers. When the chambers 91 and 92 are at a pressure which includes this centrifugal force increment, the passages 137 and 151 provide the desired volume of fluid flow. When the structure formed by the bands 78 and 79 is shifted rightwardly so as to engage the brake plates 41 and 101 to provide reverse drive, the bands 78 and 79 are stationary so that centrifugal force does not act upon the fluid in the chambers 91 and 92 and the pressure within these chambers does not have a component resulting from the action of centrifugal force. Under these conditions, the passage 153 will be open to fluid flow and the increased total passage area thereby provided will permit the proper flow of cooling and lubricating fluid even though the pressure in the chamber 92 is reduced by the absence of a centrifugal force component.

From the foregoing, it will be evident that the structure of the present invention provides a clutch assembly which is of sufficiently high strength to withstand rapid reversal of the direction of transmission of motion through the assembly. It will further be noted that such rapid reversal of the direction of the output shaft is made possible by the retention of both clutch actuating chambers 91 and 92 under positive pressure, and hence filled with fluid, under all conditions of operation of the clutch. Retention of the chambers 91 and 92 under pressure (although the pressure is of varying magnitude) under all conditions of operation also insures that the proper cooling and lubricating flow of fluid is maintained to the clutch plates. The provision whereby the total passage cross sectional area available for cooling and lubricating fluid flow is increased when the chamber 92 is at actuating pressure provides compensation for the discontinuity of the application of centrifugal force to the fluid as the assembly is actuated from direct drive engagement to reverse drive engagement.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

What is claimed is:

1. A clutch assembly providing direct drive, reverse drive and disconnection between an input and an output shaft, said assembly comprising a housing journaling the input and output shafts, a central member supported for rotation within said housing coaxially with said output shaft, said central member having a hub portion and an annular peripheral portion, a series of clutch plates supported between said input shaft and said central member and movable into motion transferring engagement to thereby rotationally lock said input shaft to said central member, a series of friction brake elements supported between said housing and said central member, said series of brake elements being movable into frictional engagement to thereby lock said central member to said housing, an annular member encircling said peripheral portion of said central member and slidable axially thereon, said annular member cooperating with said central member peripheral portion to define a first fluid pressure chamber and a second fluid pressure chamber, means for centering said annular member on said central member peripheral portion so that said fluid pressure chambers are of substantially equal volume, separate fluid passages for admitting fluid at a datum pressure to said first pressure chamber and to said second pressure chamber, separate fluid passages for passing fluid from said first and second pressure chambers to said series of clutch plates and series of brake elements respectively, cooperating gearing carried by said input shaft, central member and output shaft to provide direct drive between said shafts when said series of clutch plates are engaged and reverse drive between said shafts when said series of brake elements are engaged, said annular member moving in response to a pressure differential above said datum pressure between said first and second pressure chambers to selectively engage said series of clutch plates and said series of brake elements, and an additional fluid passage between said second pressure chamber and said series of brake elements which is unobstructed for fluid flow only when said annular member has moved to engage said series of brake elements, whereby the volume of fluid flow between said second chamber and said series of brake elements is compensated for the absence of centrifugal force acting on the fluid in said second chamber when said series of brake elements are engaged.

2. A clutch assembly providing direct drive, reverse drive and disconnection between an input and an output shaft, said assembly comprising a housing journaling the input and output shafts, a central member supported for rotation within said housing coaxially with said output shaft, said central member having a hub portion and an annular peripheral portion, a series of clutch plates supported between said input shaft and said central member and movable into motion transferring engagement to thereby rotationally lock said input shaft to said central member, a series of friction brake elements supported between said housing and said central member, said series of brake elements being movable into frictional engagement to thereby lock said central member to said housing, an annular member encircling said peripheral portion of said central member and slidable axially thereon, said annular member cooperating with said central member peripheral portion to define a first fluid pressure chamber and a second fluid pressure chamber, separate fluid passages for admitting fluid under pressure to said first pressure chamber and to said second pressure chamber, separate fluid passages for passing fluid from said first and second pressure chambers to said series of clutch plates and series of brake elements respectively, cooperating gearing carried by said input shaft, central member and output shaft to provide direct drive between said shafts when said series of clutch plates are engaged and reverse drive between said shafts when said series of brake elements are engaged, said annular member moving in response to a pressure differential between said first and second pressure chambers to selectively engage said series of clutch plates and said series of brake elements, and an additional fluid passage between said second pressure chamber and said series of brake elements which is unobstructed for fluid flow only when said annular member has moved to engage said series of brake elements, whereby the volume of fluid flow between said second chamber and said series of brake elements is compensated for the absence of centrifugal force acting on the fluid in said second chamber when said series of brake elements are engaged.

References Cited in the file of this patent

UNITED STATES PATENTS

| | | |
|---|---|---|
| 2,150,950 | Thoma | Mar. 21, 1939 |
| 2,868,341 | Snoy | Jan. 13, 1959 |
| 2,885,909 | Mooney et al. | May 12, 1959 |